Aug. 9, 1966  E. G. SUNDBERG  3,265,535
ACCUMULATOR ELECTRODE SHEATH
Filed June 29, 1964
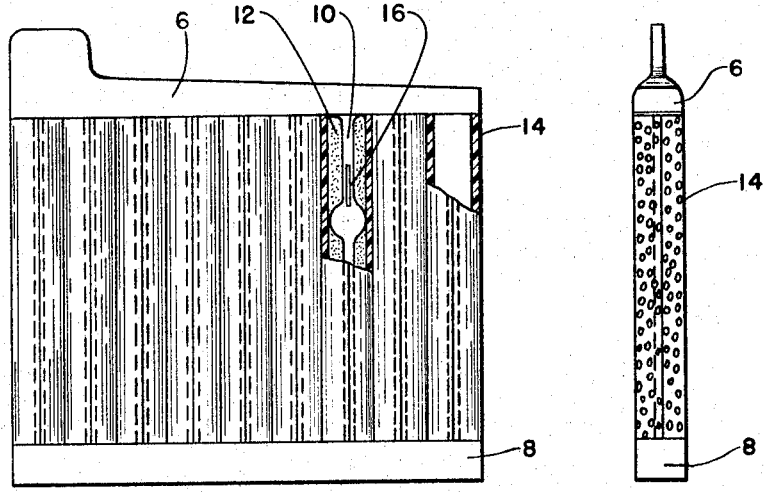
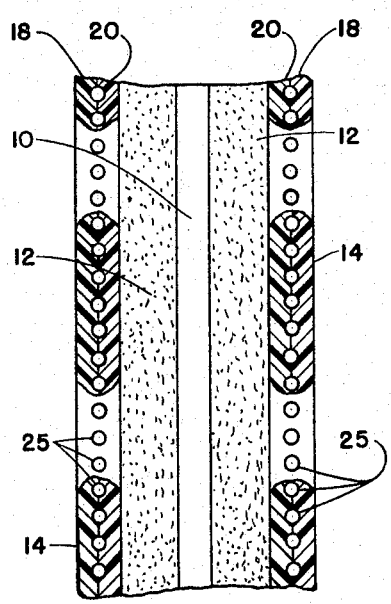
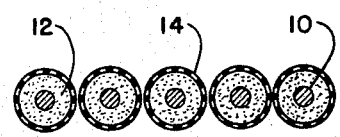
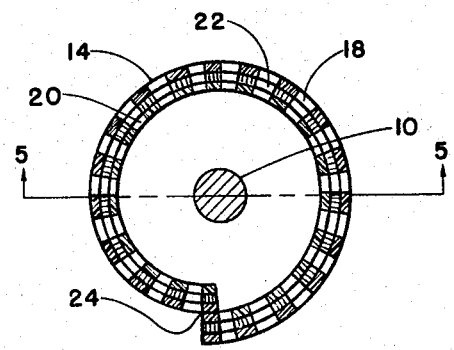
INVENTOR
ERIK G. SUNDBERG
BY *Strauch Nolan & Neale*
ATTORNEY

3,265,535
ACCUMULATOR ELECTRODE SHEATH

Erik G. Sundberg, Osbacken, Nol, Sweden, assignor to Aktiebolaget Tudor, Stockholm, Sweden, a corporation of Sweden
Filed June 29, 1964, Ser. No. 378,635
6 Claims. (Cl. 136—54)

The present invention relates to electrodes for galvanic elements, preferably for electric accumulators and particularly those of the lead-acid type, whose positive electrodes are made of so-called tube plates such as are shown in U.S. Patent No. 2,747,007. More particularly, this invention relates to a novel insulating sheath for holding the active material in place on the conductive spines or rods that form the positive tube plate.

Batteries of the foregoing type are commonly referred to as the lead-acid type in which each cell consists of negative and positive electrodes and the positive electrodes are the so-called tube plate type consisting of a number of conductive rods disposed side-by-side and connected together at the bottom and top by means of crossbraces, at least one of which is of conductive material. A conductive rod in each tube is in contact with active material, which in turn is surrounded by a tubular sheath of insulating material capable of being freely penetrated by the electrolyte. Accumulators provided with tube plate electrodes have long life, high capacity, low internal resistance and good voltage characteristics as a result of good acid circulation. As distinguished from tube plate electrodes, the individual tubes will be referred to hereinafter as tube or tubular electrodes.

Batteries whose positive electrodes are of tube plate type are generally used for industrial or military applications where a high ratio of electrical capacity to volume and to weight is especially advantageous. Such batteries are used mainly for operating vehicles, generally vehicles whose batteries are exposed to discharging at high voltage for considerable time periods, and also to relatively great mechanical strains due for example to vibrations and other shocklike influences. A very wide range of applications for such batteries is, for example, as sources of power in rail vehicles, trucks of all kinds and submarines. In some countries, many long stretches are travelled with battery-driven rail vehicles with a relatively long-range capacity.

It is therefore of technical and economical significance that the capacity per unit of volume and weight of such batteries be as high as is absolutely possible. A great deal of effort has been expended to further increase the battery capacity per unit volume which is proportional to the amount of active material in a battery cell and to the electrode surface available for the electrochemical reactions. In a tube type electrode plate the active surface is substantially greater than in a paste-filled grid electrode of the flat type. The configuration of the electrode, moreover, facilitates the circulation of the electrolyte and hence has a favorable effect on the capacity of the battery.

In the search for higher battery capacity, efforts have been directed toward making the thickness of the sheath surrounding the active material to be as thin as possible. Representative of such prior art sheaths are those shown in U.S. Patent Nos. 2,896,006 and 3,081,368, and in my copending U.S. application Serial No. 197,050 filed May 23, 1962, now abandoned. In these prior constructions, reducing the wall thickness has resulted in so much flexibility and so little strength in the sheaths that the life of the electrodes is reduced. Thus, while the electrodes having sheaths that are very thin and thus have high initial electrical capacity, a decreased battery life has been experienced even though there has been no rupture or apparent mechanical failure of the sheath.

The principal object of the present invention is to provide an improved sheath which not only provides comparatively high initial capacity in the battery, but contributes to increasing the useful life of the battery and decreases the rate at which the capacity of the battery decreases with use. In accordance with the present invention, it has been found that where the electrode sheath is comparatively rigid and less mobile than the prior flexible sheaths, the electrode has a substantially longer life. The reason for this longer life is not fully understood, but it is believed that the sheath which prevents an increase in volume which normally occurs as the active material is transformed into lead sulphate, imparts a denser structure to the active material. As a result of this densification, the contact between separate particles within the active material is improved and maintained even after repeated transformation of the material into lead sulphate. It is the transformation of the active material into lead sulphate which causes the increase in volume and apparently the slowly rising electrical resistance internally of the active material to thereby decrease the capacity of the battery.

Another object of the invention is to provide novel sheaths which are thin-walled and thus have as large an inner diameter as possible, but which are characterized by being rigid and so constructed as to resist increase in diameter of the sheath due to swelling of the active material.

A further object of the invention resides in providing a sheath formed as a plastic laminate, the laminate consisting of two perforated sheets of plastic material between which a fibrous mat is disposed and which penetrates into the plastic material when the outer sheets are pressed together to form the laminate. The perforations in the two sheets are generally aligned to be opposite one another to insure good electrolyte circulation and the entire thickness of the sheath is reduced as much as possible, consistent with the object of the invention, to thereby provide the maximum capacity of the battery.

As a further feature of the invention, it has been found that if the individual fibers composing the fibrous layer, or at least a substantial or predominate proportion of them, are disposed in a direction perpendicular to the longitudinal axis of the cylinder forming the sheath, they provide tension members surrounding the periphery of the sheath and thus contribute to the rigidity of the structure which opposes enlargement of the sheath diameter as the active material increases in volume due to conversion to lead sulphate.

These and other objects of the invention will become more fully apparent from the claims, and from the description as it proceeds in connection with the drawings wherein:

FIGURE 1 is a front elevation of a tube plate electrode embodying a plurality of electrode rods having the outer sheaths in substantially touching relationship;

FIGURE 2 is a plan view showing in cross-section five of the individual tubes forming the tube plate of FIGURE 1;

FIGURE 3 is an end elevation of the tube plate electrode shown in FIGURE 1;

FIGURE 4 is an enlarged cross-section of a single tube electrode showing one way in which the ends of the sheet material forming the novel sheath of the present invention may be attached; and FIGURE 5 is an elevation in section taken along line 5—5 of FIGURE 4.

Referring now to the drawings, the positive plate electrode may be of conventional construction and comprise an upper crossbrace 6 and a lower crossbrace 8. The electrode conductive spines or rods 10 are connected at top and bottom ends to crossbraces 6 and 8 and surrounded by a cylindrical mass of active material 12; tube sheaths 14 are located symmetrically about rods 10 as by flattened rod portions 16; and the active material 12 may then be placed in position as shown in the portion broken away in FIGURE 1.

The tubular sheath 14 of the present invention is formed of a pair of sheets 18 and 20 of a suitable plastic material, such as polyethylene, that are laminated together on opposite sides of a layer 22 (see FIGURE 4) of fibrous material which preferably consists of glass fibers or threads. As best shown in FIGURE 5, it is preferable, though not essential, that a substantial portion of the individual threads 24 which form the fibrous layer 22 indicated in FIGURE 4, extends in a direction generally perpendicular to the longitudinal axis of the cylindrical sheath. The threads 25 thus oriented form circumferentially extending tension members that resist stretching and thus tend to minimize the expansion of the diameter of sheath 14.

Fibrous layer 22 is located between two plastic sheets 18 and 20 which when made of a thermoplastic material, can be made to penetrate into the plastic material under the influence of elevated temperatures and pressures which are used to form the laminated layer.

Fibrous layer 22 may be a filter mat, a braid, or a fabric woven in any desired manner including a mixture of different textile techniques. Satisfactory results have been achieved in the production of the improved sheath of the present invention by several commonly used materials as well as with several commonly used techniques for forming the materials. Glass has been found to be particularly advantageous, and a felt mass consisting of glass fibers, the major portion of which are oriented in a direction perpendicular to the longitudinal axis of the sheath has been found to be the preferred construction for fiber layer 22.

In constructing the improved sheath 14 of the present invention, two flat sheets of perforated plastic material such as polyethylene are laid one on the other so that the perforations are substantially in alignment and with the intermediate addition of a layer of glass fibers. The sheets are then subjected to sufficient pressure and heat so as to cause the adjacent faces of the two sheets to become bonded together and include the glass fibers. With certain types of plastic, such as polyester sheets, it is sometimes desirable to coat the surfaces of the sheets which lie against the fibrous layer with a solvent or liquid plastic adhesive which will cause the plastic materials to soften and form a bond at lower temperatures which will not affect the chemical stability of the plastic material.

After the perforated laminate is formed as a flat sheet, the sheet is then curved into the shape of a tube having a diameter suitable for use in the battery. The material is thus cut so that the ends may overlap as shown in FIGURE 4 at 24. The ends at 24 may be bonded together in any conventional manner as by welding, ultrasonics, induction heating, infra-red heating and the like, and the finished tube is then cut into lengths suitable for use in the batteries.

The sheaths 14 are then mounted on rods 10 and filled with active material, then covered with cross bar 6 to enclose the tube openings in accordance with conventional procedures.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A tubular electrode for use in a tube plate type electrode for a storage battery comprising: a rod of conductive material; active material surrounding said rod; and a tubular insulating sheath surrounding said active material in place, said sheath being formed of a laminate comprising two perforated sheets of a plastic material that is resistant to deteriorative chemical attack by said electrolyte, said sheets being arranged with their perforations substantially in alignment and disposed on opposite sides of a layer of fibrous material with the fibers penetrating partially into the sheet material.

2. The electrode as defined in claim 1 wherein the fibrous material has a substantial portion of fiber strands oriented to extend in a direction circumferentially around the active material and serve as tension cords to minimize expansion of the sheath diameter.

3. The electrode as defined in claim 2 wherein the plastic material is polyethylene and the fibrous material comprises glass fibers.

4. A method of forming a tubular sheath for surrounding active material in powder form on a rod serving as an electrode in a battery having a liquid electrolyte comprising the steps of: placing two perforated sheets of plastic, electrolyte resistant, insulating material on opposite sides of a fibrous layer with the perforations in each sheet substantially in alignment; securing said sheets together to form a laminate with at least partial penetration of the fibers from said fibrous layer into the sheet material; and thereafter forming the laminate into the shape of a tubular case to serve as said sheath.

5. The method as defined in claim 4 wherein the fibrous layer contains a substantial proportion of fibers oriented to extend circumferentially around said sheath to minimize expansion of the sheath diameter.

6. The method as defined in claim 5 wherein the plastic material is polyethylene and the fibrous layer is composed of glass fibers.

References Cited by the Examiner

UNITED STATES PATENTS

| | | | |
|---|---|---|---|
| 1,872,553 | 8/1932 | Ayers | 161—113 |
| 2,747,007 | 5/1956 | Brandt | 136—63 |
| 3,194,872 | 7/1965 | Garner | 174—25 |

References Cited by the Applicant

| | | |
|---|---|---|
| 2,343,970 | 3/1944 | Galloway. |
| 2,374,540 | 4/1945 | Hall. |
| 2,866,841 | 12/1958 | Zahn. |
| 2,896,006 | 7/1959 | Sundberg. |
| 3,081,368 | 3/1963 | Wunsche. |

FOREIGN PATENTS 225,478    2/1959    Australia.

WINSTON A. DOUGLAS, *Primary Examiner.*

ALLEN B. CURTIS, *Examiner.*

A. SKAPARS, *Assistant Examiner.*